Patented Apr. 17, 1945

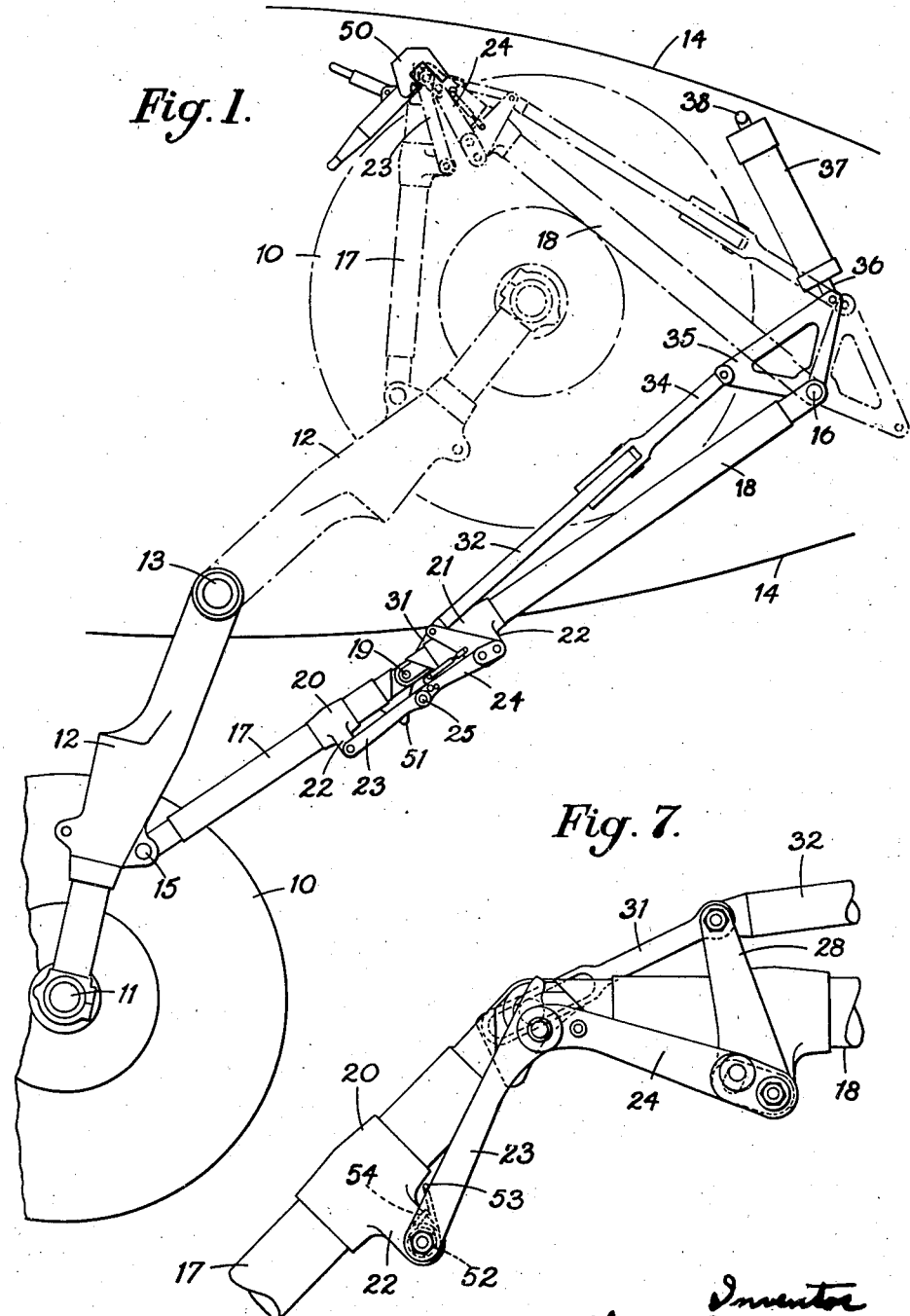

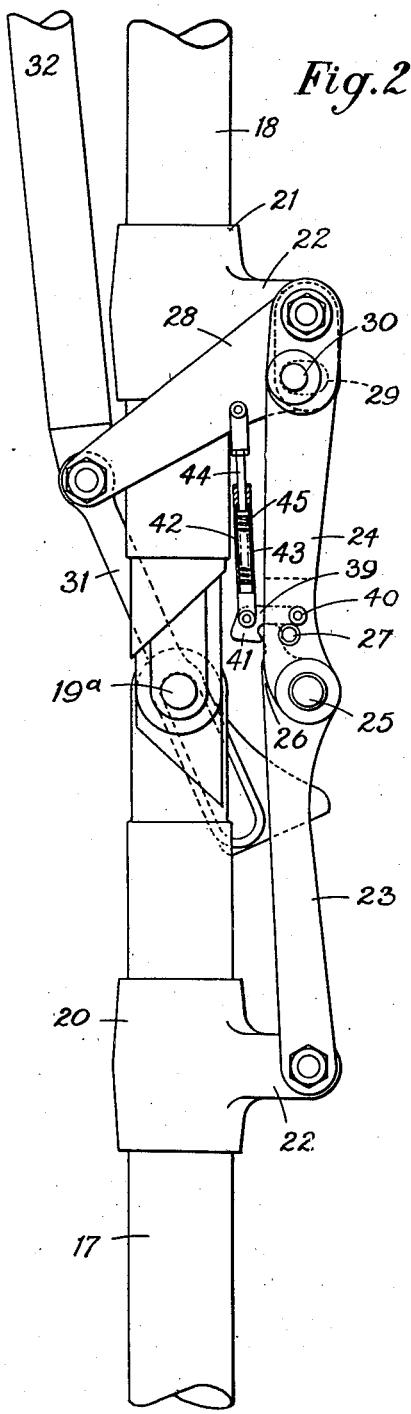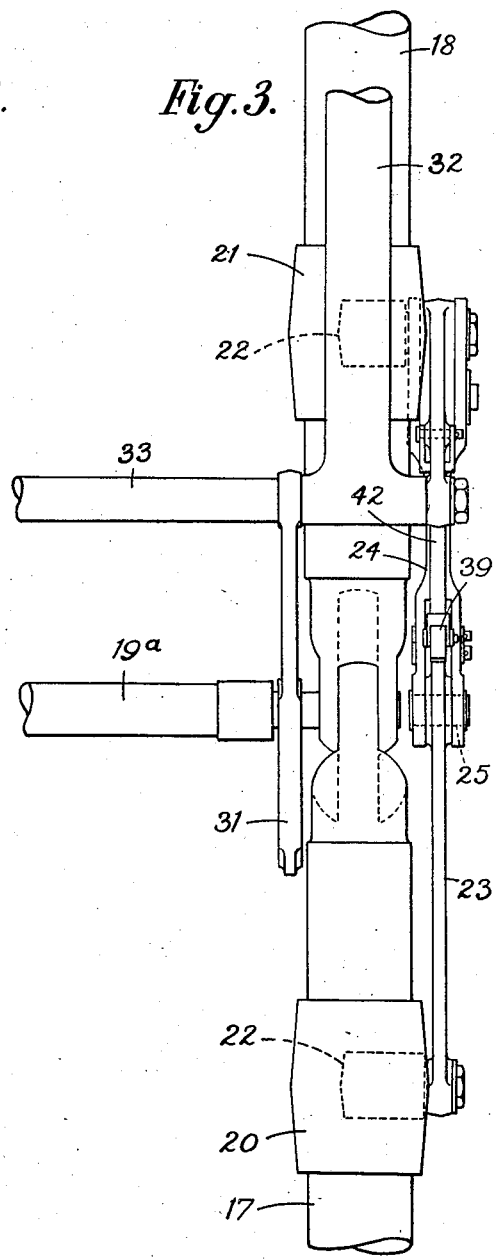

2,374,146

UNITED STATES PATENT OFFICE 2,374,146

RETRACTABLE UNDERCARRIAGE FOR AIRCRAFT

Charles Deryck Waters, Leamington Spa, England, assignor to Automotive Products Company Limited, Leamington Spa, England Application November 27, 1942, Serial No. 467,132
In Great Britain December 1, 1941

7 Claims. (Cl. 244—102)

This invention relates to retractable undercarriages for aircraft of the type in which the retraction and extension of the landing element are effected respectively by the folding and straightening of a strut or radius rod forming a part of the undercarriage. It has generally been found desirable to provide a latch or equivalent device for holding such a folding strut or radius rod in its straightened condition, as otherwise any load acting thereon in a direction other than along its axis will tend to cause it to fold, thus permitting the undercarriage to collapse.

It is the principal object of the present invention to provide an improved means for holding the folding strut or equivalent in its straight condition.

An aircraft undercarriage of the type referred to usually comprises a main strut carrying the wheel or other landing member, the said main strut being itself a shock absorber or having shock absorbing means interposed between it and the landing element, and one or more bracing struts or radius rods to brace the main strut in its extended position. The main strut or one of the bracing struts is formed in two parts pivoted together, the folding or straightening of the said strut causing the remaining parts to swing about a pivotal mounting and so retract or extend the undercarriage. The folding member is referred to hereinafter as a "folding strut" and it is to be understood that it may be the main strut or a bracing strut or radius rod of an undercarriage.

According to the present invention, a folding strut comprises two parts pivoted together and having attached to said parts respectively the two ends of a toggle linkage extending across the pivot and folding in a plane parallel to the plane in which the strut folds, at least one end of the toggle linkage being attached to the strut at a point offset from the thrust line of the strut in a direction parallel to the planes of folding, and the toggle being fully extended when the strut is in its straight condition.

According to one aspect of the present invention, means for holding in the extended position a foldable bracing member comprising a toggle linkage extending across the joint of the bracing member and attached to both parts thereof, the toggle having a thrust line offset from that of the bracing member in a direction parallel to the plane of folding of the bracing member, and being fully extended when the bracing member is also fully extended.

The toggle linkage, when in the straight condition, is preferably parallel to the strut or bracing member, and the elbow of the toggle linkage preferably lies, when the strut or bracing member is extended, on a line perpendicular to the strut and passing through the pivot of the latter. Means may be provided for resisting movement of the toggle linkage away from the extended position, such movement resisting means comprising, for example, a latch or a resilient member such as a spring urging the toggle towards its extended position.

The mechanism for folding and extending the strut is preferably connected thereto with lost motion, said mechanism being also connected with the toggle linkage and adapted to break the joint of the toggle linkage during the lost motion movement. The mechanism for this purpose may comprise an arm fulcrumed on one part of the folding strut, a link engaging with lost motion, an abutment on the strut, a connection between the arm and the toggle, and means acting to turn the arm about its fulcrum on the strut to fold and straighten both the strut and the toggle, the toggle being broken at the initiation of a folding movement during the lost motion in the connection between the arm and the strut. A latch may be provided to hold the toggle in the extended position, said latch being released during relative lost motion between the arm and the toggle. The arm may be pivoted on one of the attachment points of the toggle to the strut, and may be formed with a slot in which is engaged a pin on the adjacent toggle link, a resilient link being provided to connect the latch to said arm and withdraw the latch during relative movement of the pin and slot.

The invention is hereinafter described with reference to the accompanying drawings, in which:

Figure 1 is a side elevation of a retractable undercarriage unit for an aircraft incorporating the invention, the undercarriage unit being shown in full lines in the extended position, and in chain-dotted lines in the retracted position;

Figure 2 is an enlarged view of the central part of the folding strut shown in Figure 1, looking from the side;

Figure 3 is a view of the part of the folding strut shown in Figure 2, taken from above in a direction perpendicular to the length of the strut;

Figure 7 is a view similar to Figure 6 of a modified form of folding strut.

Figure 4:
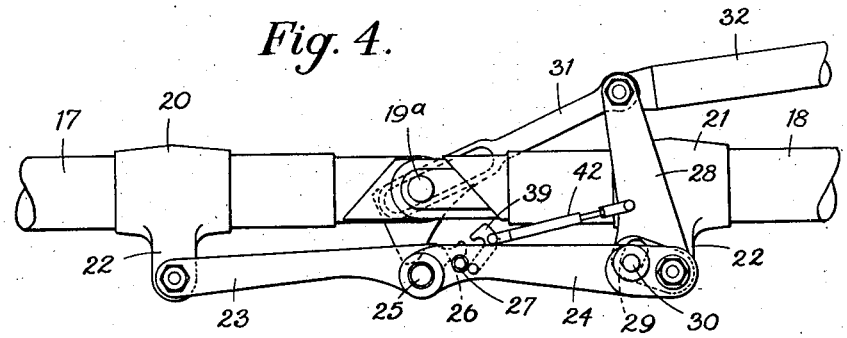
Figures 4, 5 and 6 are views corresponding to Figure 2, but showing the strut at various stages of the folding and straightening movement.

Referring to the drawings, Figure 1 shows an undercarriage of the known type in which a wheel 10 is mounted on an axle 11 between two oleo-pneumatic shock absorbers 12 forming a fork, the wheel 10 and shock absorbers 12 being capable of swinging, for retraction, about a pivotal axis 13 in the structure of the aircraft, usually in an engine nacelle the outline of which is indicated in Figure 1 at 14. The retraction and extension of the undercarriage unit is controlled by a pair of folding struts each extending backwardly and upwardly when the unit is extended, from an attachment point 15 on the cylinder portion of one of the shock absorbers to a pivotal mounting at 16 in the aircraft structure. In the arrangement illustrated, the folding struts, only one of which is shown, each comprises two parts 17 and 18 pivotally connected at 19 by a pivot shaft 19a which extends between the two struts and prevents relative lateral movement between them, as well as ensuring that they fold in unison.

In the following description, only one folding strut will be referred to, but it is to be understood that the other strut is identical therewith, and reference may be had to Figures 2 and 3 of the drawings which show the central part of the strut on a larger scale than that of Figure 1.

On each part 17 and 18 of the strut, at an equal distance from the pivot 19, is mounted a collar, the collar on the part 17 being indicated at 20, and the collar on the part 18 at 21. On each collar 20 or 21 is formed a projecting lug 22 to which on parallel axes set at equal distances from the axis of the strut, are mounted the outer ends of a pair of toggle links 23 and 24, connected at their inner ends by a pivot pin 25. The plane of folding of the toggle links 23 and 24 is offset to one side of the plane of folding of the strut 17, 18. As is shown in Figure 3, the link 23 is substantially flat, whilst the link 24 is forked at its inner end to embrace the link 23, and is also forked at its outer end for a purpose to be hereinafter described. The link 23 is formed with an extended finger 26 at its inner end which is adapted to engage with a pin 27 extending between the limbs of the forked end of the link 24, to prevent the toggle from moving beyond the straight position in one direction. Mounted on the pivot of the link 24, between the limbs of the outer forked end of that link, is an arm 28 extending across the strut part 18, the arm 28 having in it a slot 29 through which passes a pin 30 extending between the fork arms of the toggle link, so that the arm 28 has a limited degree of lost motion with respect to the toggle link. To the other end of the arm 28 are pivotally connected a slotted link 31 through the slot in which passes the pivot shaft 19a, and a link 32 extending towards the end of the strut part 18 pivoted to the aircraft structure, the pivot pins which connect the parts 28, 31 and 32 on each folding strut of a pair being formed by the ends of a common shaft 33 (see Figure 3) extending between the two struts. The slotted link 31 lies on the opposite side of the plane of folding of the strut to the toggle linkage 23, 24 and the length of the slot therein is determined so that one or other of its ends engages the shaft 19a under certain conditions hereinafter defined. The link 32 (see Figure 1) is secured at its other end to a yoke member 34 extending between the two folding struts of the pair, the yoke 34 being pivotally connected in turn to one arm of a bell-crank lever device 35 pivoted at its elbow on the pivot 16 of the struts, and having its other arm connected to the ram 36 of a hydraulic jack 37 mounted at 38 in the aircraft structure.

In order to ensure that the toggle links are not moved from the straight position inadvertently, as by vibration during taxiing of the aircraft over a rough surface, a latch is provided on the link 24 to co-operate with the finger 26 on the link 23. The latch 39 is pivoted on a pin 40 extending between the fork arms at the inner end of the link 24, and has a hooked end 41 to engage the finger. A resilient link 42 is arranged between the latch 39 and the arm 28, so that the latch may be disengaged by appropriate movement of the arm with respect to the toggle link. The resilient link comprises a cylindrical casing 43 in which is movable a plunger 44, a spring 45 tending always to extend the link.

The operation of the folding strut will now be described with particular reference to Figures 2 and 4 to 6 of the accompanying drawings.

Figure 5:
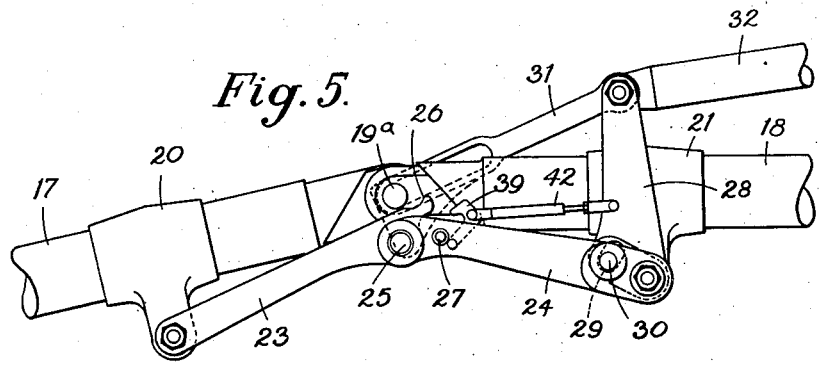
Figure 6:
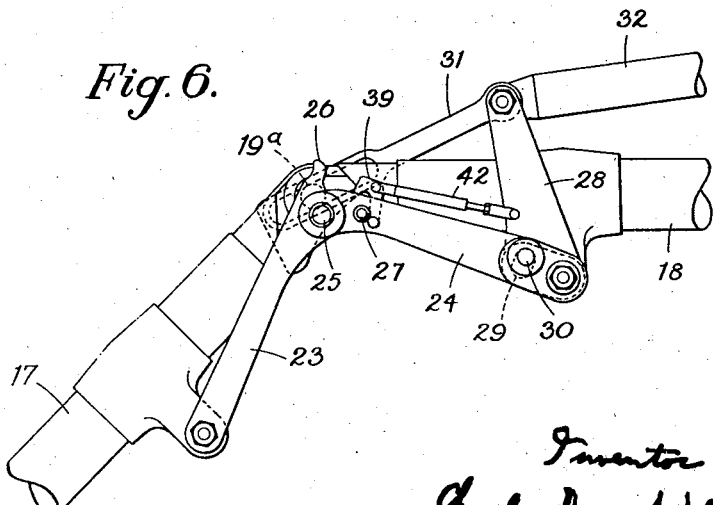

In Figure 2 the strut is fully extended, and is locked in the extended position by the toggle links, since evidently any folding of the strut must be accompanied by a change in the overall length of the toggle. The toggle is inextensible, and so long as it is not folded cannot be shortened. The toggle itself is prevented from folding by the latch 39, which holds the finger 26 between itself and the pin 27. The arm 28 is at its extreme position in an anti-clockwise direction with respect to the toggle link 24, and the slotted link 31 is positioned with the pivot shaft 19a at the end of the slot nearer to the arm 28. The bell-crank lever 35 is also at the extreme end of its rotation in an anti-clockwise direction, and the ram 36 of the jack 37 is withdrawn into the cylinder. To retract the undercarriage, fluid is supplied to the jack 37 to project the ram, causing clockwise turning of the bell-crank lever 35 about the pivot 16, and so applying a pull to the link 32. This pull first of all turns the arm 28 about its pivot, causing the slotted link 31 to move relatively to the pivot shaft 19a, and the slot 29 in the arm to move relatively to the pin 30 on the toggle link 24. During this initial movement, the latch is pulled by the link 42 away from the finger 26, until, when the pin 30 reaches the end of the slot 29, the latch is clear of the path of the finger. At this point the pivot shaft 19a has still not reached the end of the slot in the link 31, the position of the parts being shown in Figure 4. The continued movement of the arm 28 turns the toggle link 24 about its pivot on the lug 22, and so breaks the toggle and causes folding of both the toggle and the strut to commence. In consequence of their offset position, the toggle links fold through a greater angle than the strut itself during any given movement of the latter, and thus, after folding has commenced, the slotted link continues to move relatively to the pivot shaft 19a, until the end of the slot engages the pin, and the pull is applied directly to the pivot shaft. No further relative movement of the arm 28, strut part 18, link 31 and bell-crank lever 35 then takes place, but the bell-crank lever 35 continues to be turned about the pivot 16, and the strut part 18, being substantially rigid therewith, turns with it, until the undercarriage unit reaches the retracted position, shown in chain-dotted lines in Figure 1. As the toggle links continue to move through greater angles than the strut parts, the pin 30 again moves away to some extent from the end of the slot 29, as can be seen in Figure 5, which shows the strut soon after it has commenced to fold. In the retracted position, the undercarriage is held by a catch 50, Figure 1, which forms no part of this invention, and may be of any convenient kind, being released when the undercarriage is to be lowered by a projection 51 on the slotted link 31. The lowering of the undercarriage is effected by retracting the ram 36 into the jack cylinder, thus causing the bell-crank lever to turn in an anti-clockwise direction about the pivot 16. Such movement first of all takes up the clearance between the pin 30 and slot 29, thus moving the slotted link 31 relatively to the pivot shaft 19a to release the catch 50, and at the same time moving the latch 39 to a position in relation to the toggle link 24 such that it is ready to engage the finger 26 when the toggle is straightened. The undercarriage then tends to fall due to its own weight for a greater or less proportion of its travel, the strut and toggle being finally straightened by pressure transmitted to the pin 30 from the arm 28. The finger 26 pushes back the latch 39 against the spring 45 as the toggle straightens, and the latch springs into place to hold it in position. Figure 6 shows the strut at an intermediate position during the lowering operation, it being assumed for purposes of illustration that at the position shown the undercarriage unit is not falling freely.

Figure 7 shows an arrangement in which the latch for the toggle links is omitted, a spring 52 being provided to urge the toggle links towards the straight position and prevent breaking of the toggle due to vibration and other external forces. The spring 52 is coiled about the pivot of the toggle link 23 on the lug 22 of the sleeve 20, having one end 53 engaged with the toggle link, and the other end 54 engaged with the lug 22. The arrangement is otherwise similar to that previously described, lost motion still being provided between the toggle link 24 and the arm 28 to allow for the different angles of movement of the strut parts and toggle links, although such movement is not required to operate the latch. As a further alternative, the toggle may be held in the extended position by trapping liquid in the hydraulic jack by which the undercarriage is retracted and extended.

The invention has been described with reference to a form in which the folding strut is duplicated, but it will be understood that a single strut might be used where convenient.

The folding strut itself may be modified in various ways. For example, the toggle linkage need not lie parallel to the strut when both are extended, but may have one end connected directly to the strut and the other end to an offset pivot. The toggle links need not be of equal length. The toggle may fold in the same direction as the strut, or in the opposite direction, that is the elbow pivots of the two may move towards or away from each other during folding. The operating force may be applied solely to the toggle, since the folding and extension of the toggle are necessarily accompanied by the folding and extension of the strut.

The invention may be applied to undercarriages having a single shock absorber supporting each wheel, and to undercarriages designed for retraction in a forward or sideways direction. It may also be applied to the mountings of nose wheels and tail wheels.

The external forces, such as vibrations due to travelling over rough ground, which tend to throw the folding strut out of its true alignment and permit folding and consequent collapse of the undercarriage, arise primarily due to the inertia of the parts themselves. In the present invention, such loads have to break the toggle before the strut can fold, and the toggle being much smaller than the strut, it has much less inertia, and the breaking load due to vibration is correspondingly small. Thus a very light restraint applied to the toggle is sufficient to hold it extended, whereas, if the toggle were omitted, a heavy and powerful catch or equivalent could be needed to prevent the strut from folding.

What I claim is:

1. In an aircraft retractable undercarriage, a foldable bracing member comprising two main parts, a pivot joint between said main parts, pivot joints respectively between one of said main parts and the aircraft structure and between the other of said main parts and the undercarriage, said three pivot joints all lying in a common plane when the undercarriage is extended, toggle means foldable in a plane parallel to that in which the bracing member folds, the said toggle means extending across the pivot joint between the two main parts and comprising a toggle link pivotally attached to one of said main parts and a second toggle link pivotally attached to the other of said main parts and to the first toggle link, the toggle means being fully extended when the bracing member is fully extended and having its three pivotal joints then lying in a common plane different from the common plane in which the pivot joints of the bracing member lie, mechanism for folding and extending the bracing member, lost motion means connecting said mechanism to the bracing member, and a connecting means between said mechanism and said toggle means adapted to initiate folding of said toggle means whilst the said mechanism moves relatively to said bracing member due to the lost motion connecting means.

2. In an aircraft retractable undercarriage, a foldable bracing member comprising two main parts, a pivot joint between said main parts, pivot joints respectively between one of said main parts and the aircraft structure and between the other of said main parts and the undercarriage, said three pivot joints all lying in a common plane when the undercarriage is extended, toggle means foldable in a plane parallel to that in which the bracing member folds, the said toggle means extending across the pivot joint between the two main parts and comprising a toggle link pivotally attached to one of said main parts and a second toggle link pivotally attached to the other of said main parts and to the first toggle link, the toggle means being fully extended when the bracing member is fully extended and having its three pivotal joints then lying in a common plane different from the common plane in which the pivot joints of the bracing member lie, an arm fulcrumed on a part of the bracing member, a link pivoted on said arm and engaging with lost motion an abutment on the said bracing member, connecting means between the arm and the toggle means, and means acting to turn the arm about its fulcrum on the bracing member to fold and straighten both the bracing member and the toggle means.

3. In an aircraft retractable undercarriage, a foldable bracing member comprising two main parts, a pivot joint between said main parts, pivot joints respectively between one of said main parts and the aircraft structure and between the other of said main parts and the undercarriage, said three pivot joints all lying in a common plane when the undercarriage is extended, toggle means foldable in a plane parallel to that in which the bracing member folds, the said toggle means extending across the pivot joint between the two main parts and comprising a toggle link pivotally attached to one of said main parts and a second toggle link pivotally attached to the other of said main parts and to the first toggle link, the toggle means being fully extended when the bracing member is fully extended and having its three pivotal joints then lying in a common plane different from the common plane in which the pivot joints of the bracing member lie, an arm fulcrumed on a part of the bracing member, a link pivoted on said arm and engaging with lost motion an abutment on the said bracing member, lost motion connecting means between the arm and the toggle means having less lost motion than that between the link and the abutment on the bracing member, a latch adapted to hold the toggle means in the extended position, connecting means between the arm and the latch, and means acting to turn the arm about its fulcrum on the bracing member.

4. In an aircraft retractable undercarriage, a foldable bracing member comprising an upper part and a lower part, a pivot joint between the upper part and the aircraft structure, a pivot joint between the lower part and the undercarriage, and a pivot joint between the said upper and lower parts which lies, when the bracing member is extended, in the same plane as the other two pivot joints, a lug projecting from each of the parts of said bracing member in a direction perpendicular to the common plane of the said pivot joints, toggle means extending between said lugs, an arm pivoted on the upper part of said bracing member co-axially with one end of said toggle means, a link pivoted to said arm and engaging with lost motion an abutment on said bracing member, a slot in said arm, a projection on said toggle means entering the said slot, a latch adapted to hold said toggle means in the extended position, connecting means between said latch and said arm, and means for turning the arm about its pivot, the arrangement being such that the initial movement of the arm releases the latch, and brings the end of the slot in the arm into engagement with the projection on said toggle means, further movement of the arm breaks the toggle and takes up the lost motion between the link and the bracing member, and continued movement of the arm causes folding of the bracing member.

5. In an aircraft retractable undercarriage, a foldable bracing member comprising an upper part and a lower part, a pivot joint between the upper part and the aircraft structure, a pivot joint between the lower part and the undercarriage, and a pivot joint between the said upper and lower parts which lies, when the bracing member is extended, in the same plane as the other two pivot joints, a lug projecting from each of the parts of said bracing member in a direction perpendicular to the common plane of the said pivot joints, toggle means extending between said lugs, an arm pivoted on the upper part of said bracing member co-axially with one end of said toggle means, a link pivoted to said arm and engaging with lost motion an abutment on said bracing member, a slot in said arm, a projection on said toggle means entering the said slot, a latch adapted to hold said toggle means in the extended position, connecting means between said latch and said arm, a resilient link in said connecting means adapted to maintain said connecting means normally at its maximum length but to permit contraction thereof, and means for turning the arm about its pivot, the arrangement being such that the initial movement of the arm releases the latch, and brings the end of the slot in the arm into engagement with the projection on said toggle means, further movement of the arm breaks the toggle and takes up the lost motion between the link and the bracing member, and continued movement of the arm causes folding of the bracing member.

6. In an aircraft retractable undercarriage, a foldable bracing member comprising two main parts, a pivot joint between said main parts, pivot joints respectively between one of said main parts and the aircraft structure and between the other of said main parts and the undercarriage, said three pivot joints all lying in a common plane when the undercarriage is extended, toggle means foldable in a plane parallel to that in which the bracing member folds, the said toggle means extending across the pivot joint between the two main parts and comprising a toggle link pivotally attached to one of said main parts and a second toggle link pivotally attached to the other of said main parts and to the first toggle link, the toggle means being fully extended when the bracing member is fully extended and having its three pivotal joints then lying in a common plane different from the common plane in which the pivot joints of the bracing member lie, an arm fulcrumed on a part of the bracing member, a link pivoted on said arm and engaging with lost motion an abutment on the said bracing member, connecting means between the arm and the toggle means, and a hydraulic jack acting to turn the arm about its fulcrum on the bracing member to fold and straighten both the bracing member and the toggle means.

7. In an aircraft retractable undercarriage, a foldable bracing member comprising two main parts, a pivot joint between said main parts, pivot joints respectively between one of said main parts and the aircraft structure and between the other of said main parts and the undercarriage, said three pivot joints all lying in a common plane when the undercarriage is extended, toggle means foldable in a plane parallel to that in which the bracing member folds, the said toggle means extending across the pivot joint between the two main parts and comprising a toggle link pivotally attached to one of said main parts and a second toggle link pivotally attached to the other of said main parts and to the first toggle link, the toggle means being fully extended when the bracing member is fully extended and having its three pivotal joints then lying in a common plane different from the common plane in which the pivot joints of the bracing member lie, an arm fulcrumed on a part of the bracing member, a link pivoted on said arm and engaging with lost motion an abutment on the said bracing member, connecting means between the arm and the toggle means, a bell crank lever fulcrumed on an axis coincident with the pivot joint between the bracing member and the aircraft structure, a rigid link connecting one arm of the bell crank lever to the arm, and a hydraulic jack acting to turn the bell crank lever about its fulcrum to fold and straighten both the bracing member and the toggle link.

CHARLES DERYCK WATERS.